M. ARNOLD.
EXCAVATING MACHINE.
APPLICATION FILED MAR. 9, 1915.
1,164,448.
Patented Dec. 14, 1915.
3 SHEETS—SHEET 2.
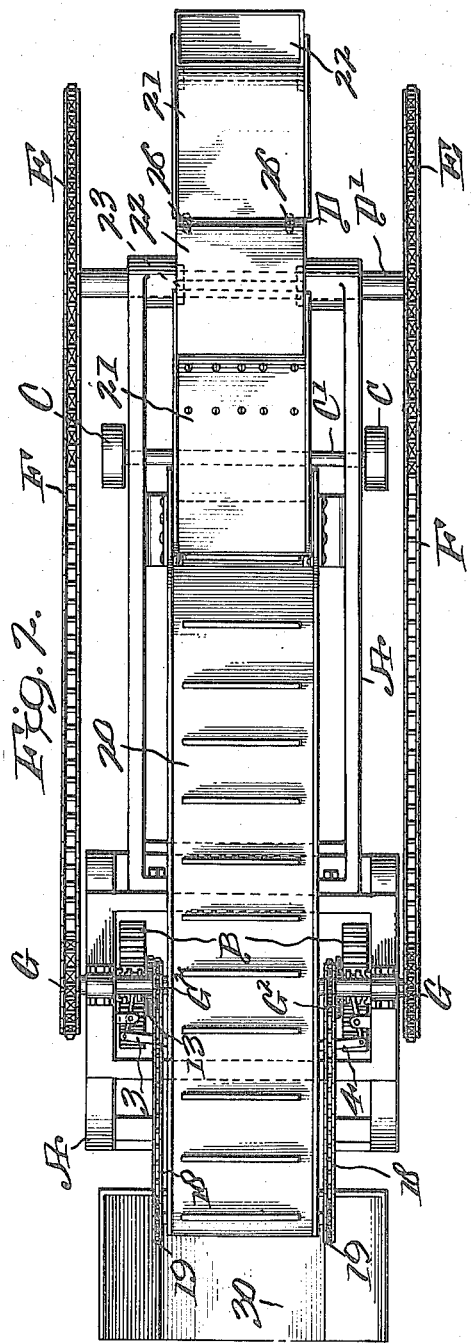
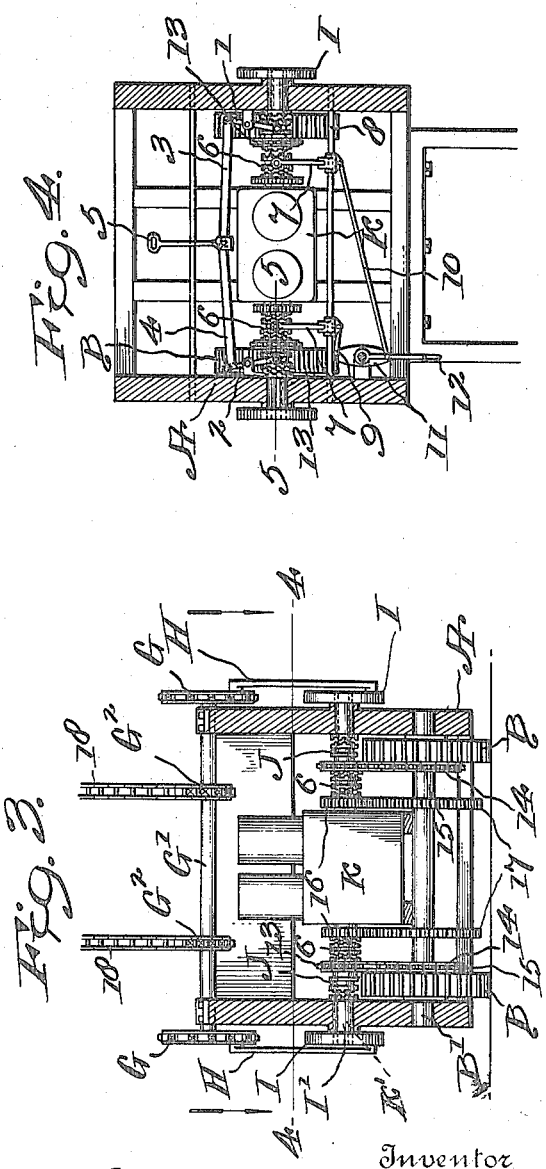
Witnesses
Edwin J. Beller
R. J. Mawhinney
Inventor
Matthew Arnold,
By Wilkinson, Guista & Mackaye
Attorneys.

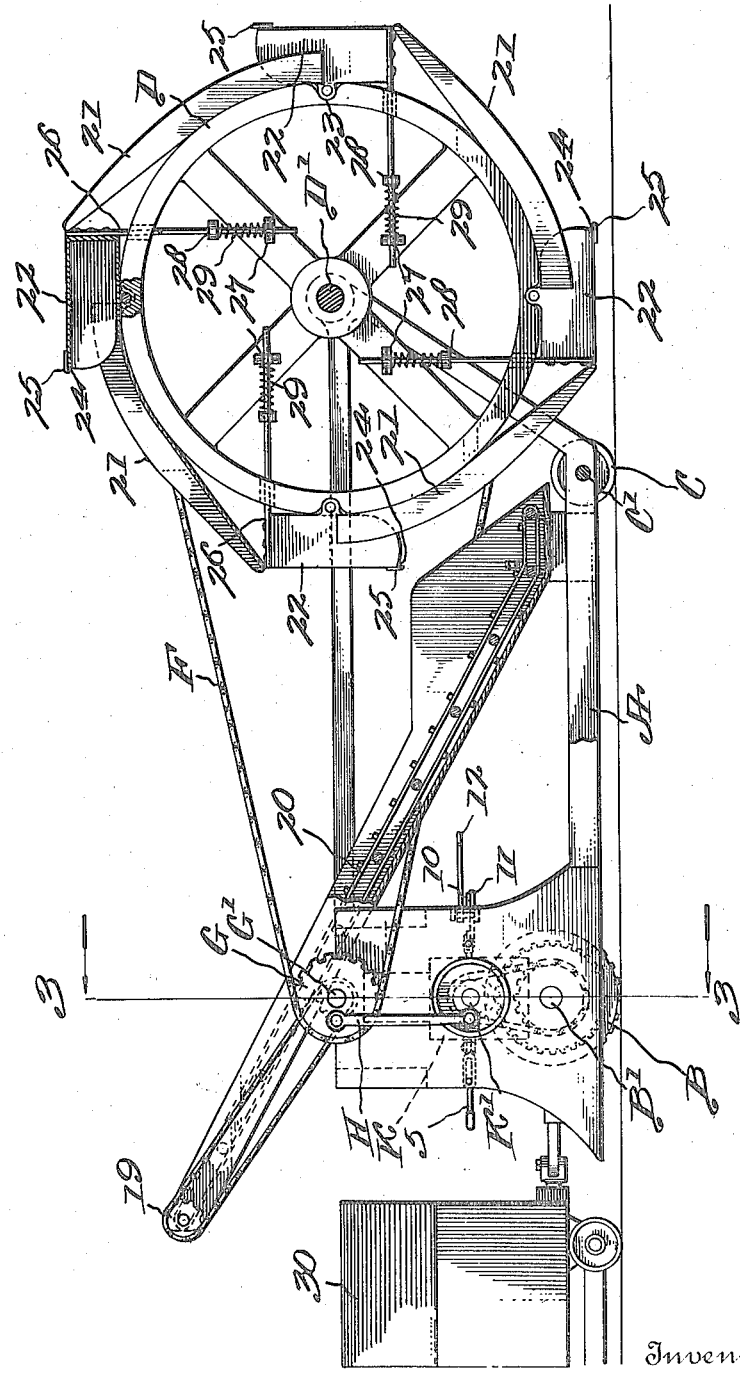

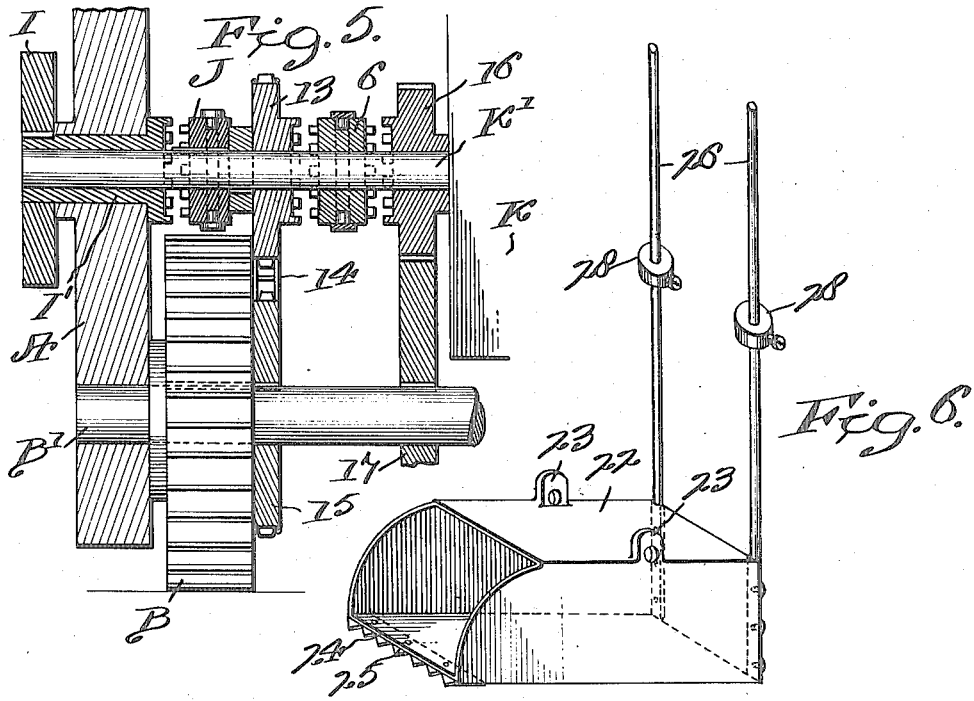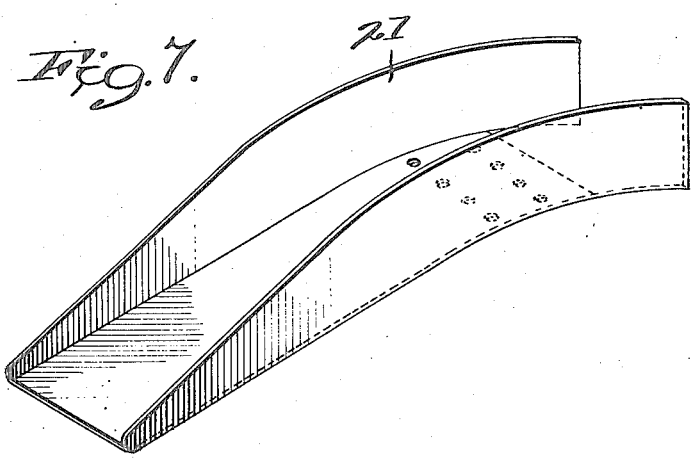

UNITED STATES PATENT OFFICE.

MATTHEW ARNOLD, OF BUTTE, MONTANA, ASSIGNOR OF ONE-HALF TO LOUIS E. HAVEN, OF BUTTE, MONTANA.

EXCAVATING-MACHINE.

1,164,448.     Specification of Letters Patent.     Patented Dec. 14, 1915.

Application filed March 9, 1915. Serial No. 13,276.

*To all whom it may concern:*

Be it known that I, MATTHEW ARNOLD, a citizen of the United States, residing at Butte, in the county of Silver Bow and State of Montana, have invented certain new and useful Improvements in Excavating-Machines; and I do hereby declare the following to be a full, clear, and exact description of the invention, such as will enable others skilled in the art to which it appertains to make and use the same.

My present invention relates to improvements in excavating machines, and it is especially intended to provide a portable or self-propelled shoveling machine adapted to be used either on the surface of the ground, or under ground, as in mining operations.

The improved machine is intended to be run either on the bottom of the furrow excavated, or on car tracks, as may be preferred.

My invention will be understood by reference to the accompanying drawings, in which:—

Figure 1 is a side elevation showing the complete machine with part of one of the trailers attached thereto, into which the excavated material is dumped; parts being shown as broken away for the sake of clearness in the drawings; Fig. 2 shows a plan view of the device shown in Fig. 1; Fig. 3 shows a section along the line 3—3 of Fig. 1, and looking in the direction of the arrows; Fig. 4 shows a section along the line 4—4 of Fig. 3, looking down; Fig. 5 shows a section along the line 5—5 of Fig. 4 and shows one half only of the arrangement of clutch members, on a larger scale; Fig. 6 is a detail showing in perspective one of the excavating buckets or shovels; and Fig. 7 is a detail showing the chute into which the excavated material is dumped, and by which it is delivered to the endless conveyer for carrying same to the trailer.

A represents the main frame or wagon body on which the operative parts are mounted, which frame is supported by the traction wheels B mounted on the shaft B', and by the front wheels C mounted on the shaft C'. These wheels may be adapted to run on tracks, if desired, or may have broad tires adapted to run on the ground.

Mounted at the front end of the frame A is the excavator wheel D journaled on the shaft D', which shaft also carries the sprocket wheels E (see Fig. 2) engaging the sprocket chains F in any convenient way, as driven by the smaller sprocket wheels G mounted on the shaft G', journaled in the rear portion of the frame A. These sprocket wheels G are driven by the connecting rods H, connected to the disks I carried by the sleeves I' loosely mounted on the engine shaft K', which sleeves are journaled in the frame A, as shown in Figs. 3 and 5, and are connected by suitable clutch members J to the shaft K' of the main engine K. Fig. 5 shows the arrangement of clutch members on one end of the engine shaft only, the arrangement on the other end being precisely the same, as shown in Figs. 3 and 4. These two clutches J are splined to the engine shaft K', and are operated by any suitable lever arrangement, as shown in Fig. 4, in which 1 and 2 are two levers pivoted to the framework and connected by the links 3 and 4 to the handle 5, all as shown in Fig. 4. Thus the engine shaft may cause to rotate the excavator wheel, or the latter may be thrown out of operation as may be desired.

In order to drive the traction wheels from the engine in either direction, I provide double acting clutch members 6, splined on the engine shaft, and connected to the arms 7, which slide upon the bar 8 and are moved in reverse directions by the rods 9 and 10 connected to the lever 11, and operated by the handle 12, as shown in Fig. 4. These clutch members 6, when in position for driving the machine forward, engage in the sprocket wheels 13, loose on the shaft I', and which are connected by the sprocket chains 14 to the sprocket wheels 15 on the rear axle B'.

When moving the machine backward, the clutch members 6 engage the pinions 16, loose on the engine shaft, which pinions mesh with the gear wheels 17 fast to the axle B'. Thus, by moving the handle 12 in one direction or the other, the engine K may be caused to drive the machine forward or backward as desired.

The shaft G' is also provided with sprocket wheels $G^2$ engaging the sprocket chains 18 for driving the sprocket wheels 19 of the endless conveyer 20.

The excavator wheel D has a series of chutes 21 attached to the periphery thereof, and having their delivery ends projecting beyond the rim of the wheel, as shown in Fig. 1. Hinged to said rim, and adapted to deliver the excavated material to said chutes, are a series of buckets 22 which are in the form of scoops, as shown in Figs. 1 and 6. These buckets are provided with hinge lugs 23, with a suitable cutting edge 24, which is preferably reinforced with a suitable cutting blade 25, preferably serrated, as shown in Fig. 6.

Fastened to the rear edges of these buckets are the rods 26 which enter loosely into the eyes 27 carried by the spokes of the wheel D, as shown in Fig. 1, and these rods 26 are provided with set collars 28 against which bear the coil springs 29. The function of these coil springs is to give a yielding resistance to the buckets when they first begin to cut into the material to be excavated, and yet permit the rear portions of the buckets to swing against and be supported by the periphery of the wheel during the act of cutting.

Attached to the rear of the frame A is a suitable trailer 30 into which the excavated material falls from the conveyer 20.

The operation of the device is as follows:—The apparatus is driven by the engine either along the surface of the road, or along the rails, as hereinbefore stated; and, when it is desired to begin the operation of excavating, the clutch members J are thrown into engagement by means of the handle 5, the clutches 6 are turned to the neutral position, and the engine will then begin to rotate the excavator wheel and to drive the conveyer 20. As the excavating progresses, the clutch members 6 are periodically thrown into engagement with the sprocket wheels 13, driving the appartus ahead a sufficient distance to cause the buckets to engage in the cut. When it is desired to withdraw from the cut, the clutches 6 are thrown into engagement with the pinions 16 and the traction wheels B are turned backward by means of the gear wheels 17. Preferably there should be a series of trailers 30 so that when one is filled it may be taken away and an empty one substituted therefor. When the cutting wheel begins to cut there will be a tendency of the buckets to swing about their hinges, compressing the springs 29. This is especially the case when the cutting edge of the bucket strikes any hard object, such as a stone, root, or the like. The spring will permit the bucket to yield sufficiently to lessen the danger of the breaking of the cutting edge of the bucket, or of its hinge.

The buckets will have only a very slight tilting motion when encountering objects and the resiliency of the bars 26 attached to same will take care of this, and will, incidentally, furnish an additional shock absorber which is the function of the springs 29 in connection with the buckets 22.

When each bucket reaches the top of the wheel, as shown in the parts in section in Fig. 1, it will begin to dump its contents into the corresponding chute, and this chute will deliver the excavated material to the conveyer which will convey it to the trailer 30.

The invention is especially applicable to working in the cuts or drifts of mines, where there is a narrow passage only to be cut and where there is little head-room.

It will thus be seen that I provide an excavating apparatus which is completely self-contained, and comprises a movable excavator driven by an engine carried thereby, and one or more trailers attached thereto, together with means for throwing said excavator into and out of operation when desired, and for moving the same forward or backward at will.

While I have shown an internal combustion engine, it will be obvious that any suitable motor power may be used, such as an electric motor, or an engine operated by compressed air or steam.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:—

1. In an excavating apparatus the combination with an excavator wheel and means for driving the same, of a series of excavating buckets having their bottoms hinged to the periphery of said wheel and having their heels adapted to swing against said periphery when pressure is applied to their cutting edges, and springs adapted to press outward upon the heels of said buckets and to provide a yielding resistance when the cutting edges of said buckets are in the operation of excavating, substantially as described.

2. In an excavating apparatus the combination with an excavator wheel and means for driving the same, of a series of excavating buckets having their bottoms hinged to the periphery of said wheel and having their heels adapted to swing against said periphery when pressure is applied to their cutting edges, rods secured to the heels of said buckets and projecting inwardly toward the center of said wheel, and provided with set collars, guides on said wheel for said rods, and coil springs mounted over said rods and engaging between said set collars and said guides, thus providing a yielding resistance to the cutting edges of said buckets when the excavator wheel is in operation, substantially as described.

3. In an excavating apparatus the combination with an excavator wheel and means for driving the same, of a series of excavating buckets having their bottoms hinged to the periphery of said wheel and having their heels adapted to swing against said periphery when pressure is applied to their cutting edges, springs adapted to press outward upon the heels of said buckets and to provide a yielding resistance when the cutting edges of said buckets are in the operation of excavating, and chutes secured to the periphery of said wheel and adapted to receive the excavated material from said buckets, substantially as described.

4. In an excavating apparatus the combination with an excavator wheel and means for driving the same, of a series of excavating buckets having their bottoms hinged to the periphery of said wheel and having their heels adapted to swing against said periphery when pressure is applied to their cutting edges, rods secured to the heels of said buckets and projecting inwardly toward the center of said wheel, and provided with set collars, guides on said wheel for said rods, coil springs mounted over said rods and engaging between said set collars and said guides, thus providing a yielding resistance to the cutting edges of said buckets when the excavator wheel is in operation, and chutes secured to the periphery of said wheel and adapted to receive the excavated material from said buckets, substantially as described.

In testimony whereof, I affix my signature, in presence of two witnesses.

MATTHEW ARNOLD.

Witnesses:
 D. J. Fitzgerald,
 Gladys Winkelman.